(12) United States Patent
Ito et al.

(10) Patent No.: US 6,888,285 B2
(45) Date of Patent: May 3, 2005

(54) DYNAMO-ELECTRIC MACHINE AND FAN MOTOR FOR VEHICLE

(75) Inventors: Toshimoto Ito, Toyohashi (JP); Toshihiro Tanino, Hamamatsu (JP); Yousuke Natsume, Toyohashi (JP); Isamu Adachi, Hamamatsu (JP); Tetsuro Shimmura, Toyohashi (JP)

(73) Assignee: ASMO Co., Ltd. (JP)

( * ) Notice: Subject to any disclaimer, the term of this patent is extended or adjusted under 35 U.S.C. 154(b) by 143 days.

(21) Appl. No.: 10/275,878

(22) PCT Filed: May 10, 2001

(86) PCT No.: PCT/JP01/03892

§ 371 (c)(1),
(2), (4) Date: Nov. 12, 2002

(87) PCT Pub. No.: WO01/86784

PCT Pub. Date: Nov. 15, 2001

(65) Prior Publication Data

US 2003/0137211 A1 Jul. 24, 2003

(30) Foreign Application Priority Data

May 10, 2000 (JP) .......................................... 2000-136950
Sep. 18, 2000 (JP) .......................................... 2000-282525

(51) Int. Cl.$^7$ ............................................. H02K 13/00
(52) U.S. Cl. ........................................ 310/233; 310/236
(58) Field of Search ................................ 310/233, 236, 310/237

(56) References Cited

U.S. PATENT DOCUMENTS

| | | | | |
|---|---|---|---|---|
| 1,531,595 A | * | 3/1925 | Chaix et al. .............. | 200/19.09 |
| 1,842,340 A | | 1/1932 | Eaton | |
| 4,224,542 A | | 9/1980 | Kawano et al. ................ | 310/68 |
| 4,396,850 A | | 8/1983 | Herr ........................... | 310/239 |
| 4,406,962 A | | 9/1983 | Fridman et al. ............. | 310/233 |
| 4,433,263 A | | 2/1984 | Longhouse et al. ......... | 310/233 |
| 5,204,574 A | * | 4/1993 | Kanno et al. ................ | 310/233 |
| 5,278,468 A | | 1/1994 | Escaravage et al. ......... | 310/71 |
| 5,358,341 A | | 10/1994 | Blaettner et al. ........... | 364/204 |
| 5,497,039 A | | 3/1996 | Blaettner et al. ............ | 310/51 |
| 5,793,140 A | | 8/1998 | Tuckey ....................... | 310/237 |
| 5,925,962 A | | 7/1999 | Kobman et al. ............ | 310/237 |
| 6,489,703 B2 | * | 12/2002 | Terada et al. ................ | 210/233 |

FOREIGN PATENT DOCUMENTS

| | | | |
|---|---|---|---|
| BR | 9605961-3 | 12/1995 | .......... F16K/37/00 |
| BR | 9901099-2 A | 1/2000 | .......... H01R/39/16 |
| DE | 196 52 840 A1 | 6/1997 | .......... H01R/39/06 |
| DE | 199 16 613 A1 | 11/1999 | .......... H02K/13/04 |
| FR | 2 742 590 A1 | 6/1997 | .......... H01R/39/06 |
| FR | 2 779 580 A1 | 12/1999 | .......... H01R/48/08 |
| JP | 52-84405 | 7/1977 | .......... H01R/39/04 |
| JP | 4-93480 | 8/1992 | .......... H02K/13/06 |
| JP | 9-182381 | 7/1997 | .......... H02K/13/00 |
| JP | 11-234967 | 6/1999 | |
| JP | 11-318058 | 11/1999 | .......... H02K/13/00 |

\* cited by examiner

*Primary Examiner*—Dang Le
*Assistant Examiner*—Nguyen N Hanh
(74) *Attorney, Agent, or Firm*—Parkhurst & Wendel, L.L.P.

(57) ABSTRACT

An electric rotating machine and a fan motor for vehicle are obtained, wherein variation width of current waveform resulting from occurrence of coils in a short circuit state is narrowed to reduce vibration and noise. A commutator 26 of the fan motor for vehicle comprises twelve segments 24, and a pair of positive/negative brushes are press-contacted to the commutator 26. Among the segments 24, at least one of pairs of segments that the brushes simultaneously contact have mutually different pitches. Therefore, timing when the coil in the short circuit state occurs at an armature and timing when the coil is released from the short circuit state of one brush deviate from those of the other brush temporally. Accordingly, the variation width of current waveform of electric current supplied to the coil connected to the pair of segments 24 narrows at least. As a result, the vibration of the electric rotating machine, variation of rotating torque, and the noise are considerably reduced, and life thereof is thus extended as well.

20 Claims, 14 Drawing Sheets a = b = c = d = e = g = h = i = j = k
&
f ≠ l $a = b = c = d = e = g = h = i = j = k$

&

$f \neq l$

THREE TYPES OF SEGMENT WIDTH (±1.5%)

THREE TYPES OF SEGMENT WIDTH (±2.0%)

THREE TYPES OF SEGMENT WIDTH (±3.3%)

THREE TYPES OF SEGMENT WIDTH (±5%)

THREE TYPES OF SEGMENT WIDTH (±6.7%)

FOUR TYPES OF SEGMENT WIDTH (±6.7%, ±3.2%)

THREE TYPES OF SEGMENT WIDTH

THREE TYPES OF SEGMENT WIDTH II

FOUR TYPES OF SEGMENT WIDTH

FIVE TYPES OF SEGMENT WIDTH

SIX TYPES OF SEGMENT WIDTH

SEVEN TYPES OF SEGMENT WIDTH

DYNAMO-ELECTRIC MACHINE AND FAN MOTOR FOR VEHICLE

TECHNICAL FIELD

The present invention relates to an electric rotating machine and a fan motor for vehicle, and especially to an electric rotating machine and a fan motor for vehicle, in which a positive brush and a negative brush are press-contacted to a commutator comprising a plurality of segments so as to supply electricity and commutate.

BACKGROUND ART

Among fan motors for vehicle, a fan motor for vehicle using a permanent magnet as a field (DC motor) is known. In this type of fan motor for vehicle, generally even number of field magnets are fixed inside a motor yoke so that the field magnets are opposed to each other, and an armature provided with windings is disposed more internally than the field magnets.

In this case, for example, even if four field magnets are used to form four electrodes, because two brushes for commutation (a positive brush and a negative brush) can be incorporated, or for other reasons, the armature comprises slots in which wave windings are respectively provided between teeth. The windings of the armature are respectively electrically connected to odd number of segments of a commutator, wherein the number of segments is determined in correspondence to the number of slots of the armature. The positive brush and the negative brush are press-contacted to the segments of the commutator. Accordingly, electricity is supplied to the respective slots of the armature (commutation is carried out) via the brushes and the segments.

In such a DC motor, since the brushes are press-contacted to the respective segments of the commutator, which segments are provided in correspondence to the respective slots of the armature, so as to supply electricity (commutate), as the armature rotates, coils in a short circuit state occur, wherein the coils are concurrently made to have the same potential and the occurrence positions are primarily determined (for example, the occurrence positions are four positions in the case where four electrodes and two brushes are used).

The short circuit state of the coils is a state of windings (coils) 40 wound on a laminated core of the armature, as shown in FIG. 4. For example, when each of a positive brush 42 and a negative brush 44 contacts across two mutually adjacent segments 46 of the commutator, the respective two segments 46 (segments of Nos. 6 and 7, and segments of Nos. 12 and 1) have the same potential and current does not flow therethrough, thus resulting in the short circuit state. In this case, coils A and B connected to the respective two segments 46 of the commutator are referred to as the coils in the short circuit state. Such coils in the short circuit state serially occur, while the occurrence positions are primarily determined depending upon the positional relation between the segments 46 of the commutator, and the positive brush 42 and the negative brush 44. In FIG. 4, the flow of current is schematically shown by arrows.

In this type of conventional fan motor for vehicle, since the pitches of the segments 46 of the commutator are regular, timing when the coil in the above-described short circuit state occurs, wherein the coil in the short circuit state serially occurs every time each of the positive brush 42 and the negative brush 44 contacts across two segments 46 of the commutator, and timing when the coil is released from the short circuit state (timing of switching from the short circuit state to a conductive state) of one brush are coincident with those of the other brush. This has been a cause that a value of electric current supplied to the respective slots of the armature changes rapidly in a short time and falls into ununiform disorder (variation width of current waveform changes considerably in waves).

In this manner, the timing when the coil in the above-described short circuit state occurs, wherein the coil in the short circuit state serially occurs every time each of the positive brush 42 and the negative brush 44 contacts across two segments of the commutator, and the timing when the coil is released from the short circuit state of one brush are coincident with those of the other brush, and thus, the variation width of current waveform widens. This results in vibration of the motor, variation of rotating torque, and generation of noise. There has been eagerness for countermeasures therefor.

In view of the above facts, it is an object of the present invention to obtain an electric rotating machine and a fan motor for vehicle, wherein variation width of current waveform resulting from occurrence of coils in a short circuit state is narrowed to reduce the vibration and the noise.

DISCLOSURE OF THE INVENTION

In order to attain the above object, a first aspect of the present invention is an electric rotating machine comprising: a motor yoke; a field magnet fixed inside the motor yoke; an armature comprising a rotating shaft at a central portion of a laminated core on which windings are wound, wherein a commutator comprising a plurality of segments, in which at least one pair of segments comprise mutually different peripheral widths, is attached to an end portion of the rotating shaft; and a plurality of brushes disposed opposite each other with the commutator therebetween, so as to slide on the commutator of the armature.

A second aspect of the present invention, according to the first aspect, is the electric rotating machine, wherein the plurality of segments often include variable width segments, and the variable width segments each often comprise a peripheral width varied within a range from 1.5% to 40% with respect to a reference width defined by a first formula of (360°/number of segments).

A third aspect of the present invention, according to the second aspect, is the electric rotating machine, wherein the plurality of segments often include some types of variable width segments whose peripheral width varies from the reference width, wherein the number of types thereof is not larger than the number defined by a second formula of (number of segments/2)+1.

A fourth aspect of the present invention, according to the third aspect, is the electric rotating machine, wherein the plurality of segments often include reference width segments, and the reference width segments each often comprise a peripheral width substantially equal to the reference width.

A fifth aspect of the present invention, according to the fourth aspect, is the electric rotating machine, wherein at least one of the variable width segments often comprises a peripheral width widened at a predetermined rate with respect to the reference width, and at least another variable width segment often comprises a peripheral width narrowed at a rate substantially equal to the predetermined rate with respect to the reference width.

A sixth aspect of the present invention, according to the fifth aspect, is the electric rotating machine, wherein a peripheral width of one of the variable width segments is often different from a peripheral width of another variable width segment provided opposite said one of the variable width segments with respect to a center of the commutator, and peripheral widths of segments other than said one and said another variable width segments are often respectively substantially equal to peripheral widths of the segments respectively provided opposite said segments other than said one and said another variable width segments with respect to the center of the commutator.

A seventh aspect of the present invention, according to the sixth aspect, is the electric rotating machine often further comprising a plurality of pawls, which are respectively formed to the plurality of segments and with which portions of the windings are respectively engaged in a conductive state, wherein at least one of the plurality of pawls is provided at a position displaced from the peripheral center of the respective segment.

An eighth aspect of the present invention, according to the second aspect, is the electric rotating machine, wherein the plurality of segments often include reference width segments, and the reference width segments each often comprise a peripheral width substantially equal to the reference width.

A ninth aspect of the present invention, according to the eighth aspect, is the electric rotating machine, wherein at least one of the variable width segments often comprises a peripheral width widened at a predetermined rate with respect to the reference width, and at least another variable width segment often comprises a peripheral width narrowed at a rate substantially equal to the predetermined rate with respect to the reference width.

A tenth aspect of the present invention, according to the second aspect, is the electric rotating machine, wherein at least one of the variable width segments often comprises a peripheral width widened at a predetermined rate with respect to the reference width, and at least another variable width segment often comprises a peripheral width narrowed at a rate substantially equal to the predetermined rate with respect to the reference width.

An eleventh aspect of the present invention, according to the second aspect, is the electric rotating machine often further comprising a plurality of pawls, which are respectively formed to the plurality of segments and with which portions of the windings are respectively engaged in a conductive state, wherein at least one of the plurality of pawls is provided at a position displaced from the peripheral center of the respective segment.

A twelfth aspect of the present invention, according to the first aspect, is the electric rotating machine, wherein the plurality of segments often include some types of variable width segments whose peripheral width varies from the reference width, wherein the number of types thereof is not larger than the number defined by a second formula of (number of segments/2)+1.

A thirteenth aspect of the present invention, according to the twelfth aspect, is the electric rotating machine, wherein the plurality of segments often include reference width segments, and the reference width segments each often comprise a peripheral width substantially equal to the reference width.

A fourteenth aspect of the present invention, according to the twelfth aspect, is the electric rotating machine often further comprising a plurality of pawls, which are respectively formed to the plurality of segments and with which portions of the windings are respectively engaged in a conductive state, wherein at least one of the plurality of pawls is provided at a position displaced from the peripheral center of the respective segment.

A fifteenth aspect of the present invention, according to the first aspect, is the electric rotating machine often further comprising a plurality of pawls, which are respectively formed to the plurality of segments and with which portions of the windings are respectively engaged in a conductive state, wherein at least one of the plurality of pawls is provided at a position displaced from the peripheral center of the respective segment.

A sixteenth aspect of the present invention is a fan motor for vehicle comprising: a motor yoke; a field magnet fixed inside the motor yoke; an armature comprising a rotating shaft at a central portion of a laminated core on which windings are wound, wherein a commutator comprising a plurality of segments, in which at least one pair of segments comprise mutually different peripheral widths, is attached to an end portion of the rotating shaft; a plurality of brushes disposed opposite each other with the commutator therebetween, so as to slide on the commutator of the armature; and a fan attached to the rotating shaft so as to rotate as the armature rotates.

A seventeenth aspect of the present invention, according to the sixteenth aspect, is the fan motor for vehicle, wherein the plurality of segments often include variable width segments, and the variable width segments each often comprise a peripheral width varied within a range from 1.5% to 40% with respect to a reference width defined by a first formula of (360°/number of segments).

An eighteenth aspect of the present invention, according to the seventeenth aspect, is the fan motor for vehicle, wherein the plurality of segments often include some types of variable width segments whose peripheral width varies from the reference width, wherein the number of types thereof is not larger than the number defined by a second formula of (number of segments/2)+1; wherein at least one of the variable width segments often comprises a peripheral width widened at a predetermined rate with respect to the reference width, and at least another variable width segment often comprises a peripheral width narrowed at a rate substantially equal to the predetermined rate with respect to the reference width; and wherein a peripheral width of one of the variable width segments is often different from a peripheral width of another variable width segment provided opposite said one of the variable width segments with respect to a center of the commutator, and peripheral widths of segments other than said one and said another variable width segments are often respectively substantially equal to peripheral widths of the segments respectively provided opposite said segments other than said one and said another variable width segments with respect to the center of the commutator.

A nineteenth aspect of the present invention, according to the seventeenth aspect, is the fan motor for vehicle, wherein at least one of the variable width segments often comprises a peripheral width widened at a predetermined rate with respect to the reference width, and at least another variable width segment often comprises a peripheral width narrowed at a rate substantially equal to the predetermined rate with respect to the reference width.

A twentieth aspect of the present invention, according to the sixteenth aspect, is the fan motor for vehicle, wherein the plurality of segments often include some types of variable width segments whose peripheral width varies from the reference width, wherein the number of types thereof is not larger than the number defined by a second formula of (number of segments/2)+1.

In the electric rotating machine according to the first aspect of the present invention, rotating force is generated for the armature by interaction between a magnetic field formed by the armature on which the windings get conductive via the commutator and a magnetic field formed by the field magnets fixed inside the motor yoke, and the armature is rotated by the rotating force.

In the electric rotating machine, among the plurality of segments of the commutator, at least one pair of segments comprise mutually different peripheral widths. Therefore, a period of switching current to the respective segments becomes irregular, and thus, magnetic exciting-force does not concentrate on a certain frequency.

Further, since at least one pair of segments comprise mutually different peripheral widths as described above, contact timing and contact-release timing of one brush deviate from those of the other brush. Accordingly, variation width of current waveform narrows at least in a value of electric current supplied to the coil (slot) connected to the pair of segments. As a result, vibration of the electric rotating machine, variation of rotating torque, and noise are reduced.

In the electric rotating machine according to the second aspect of the present invention, the plurality of segments include variable width segments, and the variable width segments each comprise a peripheral width varied within a range from 1.5% to 40% with respect to a reference width defined by a first formula of (360°/number of segments).

When each of the brushes contacts across two mutually adjacent segments of the commutator, the two segments have the same potential and current does not flow therethrough, thus resulting in a short circuit state. In this case, the coils connected to the respective two segments result in coils in the short circuit state. As the armature rotates, such coils in the short circuit state serially occur.

In the electric rotating machine, the plurality of segments include the above-mentioned variable width segments. Therefore, when at least one of the segments across which each of a positive brush and a negative brush contacts is the variable width segment, the contact timing and contact-release timing of one brush, i.e., timing when the coil in the above-described short circuit state occurs and timing when the coil is released from the short circuit state (timing of switching from the short circuit state to a conductive state) thereof, deviate from those of the other brush. Accordingly, variation width of current waveform narrows in a value of electric current supplied to the coil (slot) connected to the variable width segment. As a result, vibration of the electric rotating machine, variation of rotating torque, and noise are reduced.

In the electric rotating machine according to the third aspect of the present invention, the plurality of segments include some types of variable width segments whose peripheral width varies from the reference width, wherein the number of types thereof is not larger than the number defined by a second formula of (number of segments/2)+1.

When each of the brushes contacts across two mutually adjacent segments of the commutator, the two segments have the same potential and current does not flow therethrough, thus resulting in a short circuit state. In this case, the coils connected to the respective two segments result in coils in the short circuit state. As the armature rotates, such coils in the short circuit state serially occur.

In the electric rotating machine, the plurality of segments include some types of variable width segments whose peripheral width varies from the reference width, wherein the number of types thereof is not larger than the number defined by the above second formula. Therefore, when at least one of the segments across which each of the positive brush and the negative brush contacts is the variable width segment, the contact timing and contact-release timing of one brush, i.e., timing when the coil in the above-described short circuit state occurs and timing when the coil is released from the short circuit state (timing of switching from the short circuit state to a conductive state) thereof, deviate from those of the other brush. Accordingly, variation width of current waveform narrows in a value of electric current supplied to the coil (slot) connected to the variable width segment. As a result, vibration of the electric rotating machine, variation of rotating torque, and noise are reduced.

In the electric rotating machine according to the fourth aspect of the present invention, the plurality of segments include reference width segments, and the reference width segments each comprise a peripheral width substantially equal to the reference width defined by a first formula of (360°/number of segments). Therefore, when each of the positive brush and the negative brush contacts across the reference width segment and the variable width segment, the contact timing and contact-release timing of one brush, i.e., timing when the coil in the above-described short circuit state occurs and timing when the coil is released from the short circuit state (timing of switching from the short circuit state to a conductive state) thereof, deviate from those of the other brush. Accordingly, variation width of current waveform narrows in a value of electric current supplied to the coil (slot) connected to the segments. As a result, vibration of the electric rotating machine, variation of rotating torque, and noise are reduced.

In the electric rotating machine according to the fifth aspect of the present invention, at least one of the variable width segments comprises a peripheral width widened at a predetermined rate with respect to the reference width (hereinafter, this variable width segment is appropriately referred to as a "wide width segment"), and at least another variable width segment comprises a peripheral width narrowed at a rate substantially equal to the predetermined rate with respect to the reference width (hereinafter, this variable width segment is appropriately referred to as a "narrow width segment"). Accordingly, the peripheral widths of the segments other than the wide width segment and the narrow width segment can be made the same. As a result, the commutator is easily designed.

In the electric rotating machine according to the sixth aspect of the present invention, a peripheral width of one of the variable width segments is different from a peripheral width of another variable width segment provided opposite said one of the variable width segments with respect to a center of the commutator.

Therefore, even if the peripheral widths of the segments other than the one variable width segment and the another variable width segment (i.e., those of the variable width segments or the reference width segments which are quite different from the one variable width segment and from the another variable width segment) are made the same, timing when the positive brush contacts the respective segments and timing when the positive brush is released from the contact state certainly deviate from those for the negative brush.

For example, when the segments are formed to the commutator, slits are formed by a cutting tool to the commutator to which the segments have not been formed yet. In order to form the slits, cutting tools are connected to each other so that they are respectively oriented toward the center of the commutator in the radial direction, and a plurality of slits are then formed at a time by the cutting tools. After forming the slits, the cutting tools are separated from the commutator, and then, the plurality of cutting tools are rotated around the center of the commutator, or the commutator itself is rotated, such that another plurality of slits are formed at a time at other positions of the commutator around the center thereof.

In the electric rotating machine of the present invention, the peripheral widths of the segments other than the one variable width segment and the another variable width segment are respectively the same as those of the segments locating on the opposite sides thereof with respect to a center of the commutator. Therefore, when the slits are formed at other positions thereof as described above, without individually adjusting the respective rotating angles of the plurality of cutting tools, all of the cutting tools or the commutator is integrally rotated around the center of the commutator by a predetermined angle (i.e., an angle corresponding to the peripheral widths of the segments) so as to form the slits to the commutator. As a result, the operation efficiency is improved.

In the electric rotating machine according to the seventh aspect of the present invention, pawls are respectively formed to the plurality of segments, and portions of the windings are respectively engaged with the pawls in a conductive state, such that the segments get conductive to the windings via the pawls.

In general, the pawls are respectively formed at the peripheral centers of the segments. In the present invention, however, since at least one of the segments has the peripheral width which varies from those of the other segments, if the pawls are respectively formed simply at the peripheral centers of the segments, the pawls are positioned around the axis of the commutator at irregular intervals.

In the electric rotating machine, since at least one of the pawls is formed at a position circumferentially displaced from the peripheral center of the respective segment, the pawls can be positioned around the axis of the commutator at regular intervals.

In this manner, if at least one of the pawls is formed at a position circumferentially displaced from the peripheral center of the respective segment such that the pawls can be positioned around the axis of the commutator at regular intervals, when portions of the windings are respectively connected to the pawls, the windings are serially connected while the commutator (armature) is rotated by a predetermined angle. As a result, the operation efficiency is improved. In the case where the windings are automatically connected to the pawls by a winding device, a robot or the like, the winding device, the robot or the like is easily controlled.

In the electric rotating machine according to the eighth aspect of the present invention, the plurality of segments include reference width segments, and the reference width segments each comprise a peripheral width substantially equal to the reference width defined by a first formula of (360°/number of segments). Therefore, when each of the positive brush and the negative brush contacts across the reference width segment and the variable width segment, the contact timing and contact-release timing of one brush, i.e., timing when the coil in the above-described short circuit state occurs and timing when the coil is released from the short circuit state (timing of switching from the short circuit state to a conductive state) thereof, deviate from those of the other brush. Accordingly, variation width of current waveform narrows in a value of electric current supplied to the coil (slot) connected to the segments. As a result, vibration of the electric rotating machine, variation of rotating torque, and noise are reduced.

In the electric rotating machine according to the ninth aspect of the present invention, at least one of the variable width segments comprises a peripheral width widened at a predetermined rate with respect to the reference width (hereinafter, this variable width segment is appropriately referred to as a "wide width segment"), and at least another variable width segment comprises a peripheral width narrowed at a rate substantially equal to the predetermined rate with respect to the reference width (hereinafter, this variable width segment is appropriately referred to as a "narrow width segment"). Accordingly, the peripheral widths of the segments other than the wide width segment and the narrow width segment can be made the same. As a result, the commutator is easily designed.

In the electric rotating machine according to the tenth aspect of the present invention, at least one of the variable width segments comprises a peripheral width widened at a predetermined rate with respect to the reference width (hereinafter, this variable width segment is appropriately referred to as a "wide width segment"), and at least another variable width segment comprises a peripheral width narrowed at a rate substantially equal to the predetermined rate with respect to the reference width (hereinafter, this variable width segment is appropriately referred to as a "narrow width segment"). Accordingly, the peripheral widths of the segments other than the wide width segment and the narrow width segment can be made the same. As a result, the commutator is easily designed.

In the electric rotating machine according to the eleventh aspect of the present invention, pawls are respectively formed to the plurality of segments, and portions of the windings are respectively engaged with the pawls in a conductive state, such that the segments get conductive to the windings via the pawls.

In general, the pawls are respectively formed at the peripheral centers of the segments. In the present invention, however, since at least one of the segments has the peripheral width which varies from those of the other segments, if the pawls are respectively formed simply at the peripheral centers of the segments, the pawls are positioned around the axis of the commutator at irregular intervals.

In the electric rotating machine, since at least one of the pawls is formed at a position circumferentially displaced from the peripheral center of the respective segment, the pawls can be positioned around the axis of the commutator at regular intervals.

In this manner, if at least one of the pawls is formed at a position circumferentially displaced from the peripheral center of the respective segment such that the pawls can be positioned around the axis of the commutator at regular intervals, when portions of the windings are respectively connected to the pawls, the windings are serially connected while the commutator (armature) is rotated by a predetermined angle. As a result, the operation efficiency is improved. In the case where the windings are automatically connected to the pawls by a winding device, a robot or the like, the winding device, the robot or the like is easily controlled.

In the electric rotating machine according to the twelfth aspect of the present invention, the plurality of segments include some types of variable width segments whose peripheral width varies from the reference width, wherein the number of types thereof is not larger than the number defined by a second formula of (number of segments/2)+1.

When each of the brushes contacts across two mutually adjacent segments of the commutator, the two segments have the same potential and current does not flow therethrough, thus resulting in a short circuit state. In this case, the coils connected to the respective two segments result in coils in the short circuit state. As the armature rotates, such coils in the short circuit state serially occur.

In the electric rotating machine, the plurality of segments include some types of variable width segments whose peripheral width varies from the reference width, wherein the number of types thereof is not larger than the number defined by the above second formula. Therefore, when at least one of the segments across which each of the positive brush and the negative brush contacts is the variable width segment, the contact timing and contact-release timing of one brush, i.e., timing when the coil in the above-described short circuit state occurs and timing when the coil is released from the short circuit state (timing of switching from the short circuit state to a conductive state) thereof, deviate from those of the other brush. Accordingly, variation width of current waveform narrows in a value of electric current supplied to the coil (slot) connected to the variable width segment. As a result, vibration of the electric rotating machine, variation of rotating torque, and noise are reduced.

In the electric rotating machine according to the thirteenth aspect of the present invention, the plurality of segments include reference width segments, and the reference width segments each comprise a peripheral width substantially equal to the reference width defined by a first formula of (360°/number of segments). Therefore, when each of the positive brush and the negative brush contacts across the reference width segment and the variable width segment, the contact timing and contact-release timing of one brush, i.e., timing when the coil in the above-described short circuit state occurs and timing when the coil is released from the short circuit state (timing of switching from the short circuit state to a conductive state) thereof, deviate from those of the other brush. Accordingly, variation width of current waveform narrows in a value of electric current supplied to the coil (slot) connected to the segments. As a result, vibration of the electric rotating machine, variation of rotating torque, and noise are reduced.

In the electric rotating machine according to the fourteenth aspect of the present invention, pawls are respectively formed to the plurality of segments, and portions of the windings are respectively engaged with the pawls in a conductive state, such that the segments get conductive to the windings via the pawls.

In general, the pawls are respectively formed at the peripheral centers of the segments. In the present invention, however, since at least one of the segments has the peripheral width which varies from those of the other segments, if the pawls are respectively formed simply at the peripheral centers of the segments, the pawls are positioned around the axis of the commutator at irregular intervals.

In the electric rotating machine, since at least one of the pawls is formed at a position circumferentially displaced from the peripheral center of the respective segment, the pawls can be positioned around the axis of the commutator at regular intervals.

In this manner, if at least one of the pawls is formed at a position circumferentially displaced from the peripheral center of the respective segment such that the pawls can be positioned around the axis of the commutator at regular intervals, when portions of the windings are respectively connected to the pawls, the windings are serially connected while the commutator (armature) is rotated by a predetermined angle. As a result, the operation efficiency is improved. In the case where the windings are automatically connected to the pawls by a winding device, a robot or the like, the winding device, the robot or the like is easily controlled.

In the electric rotating machine according to the fifteenth aspect of the present invention, pawls are respectively formed to the plurality of segments, and portions of the windings are respectively engaged with the pawls in a conductive state, such that the segments get conductive to the windings via the pawls.

In general, the pawls are respectively formed at the peripheral centers of the segments. In the present invention, however, since at least one of the segments has the peripheral width which varies from those of the other segments, if the pawls are respectively formed simply at the peripheral centers of the segments, the pawls are positioned around the axis of the commutator at irregular intervals.

In the electric rotating machine, since at least one of the pawls is formed at a position circumferentially displaced from the peripheral center of the respective segment, the pawls can be positioned around the axis of the commutator at regular intervals.

In this manner, if at least one of the pawls is formed at a position circumferentially displaced from the peripheral center of the respective segment such that the pawls can be positioned around the axis of the commutator at regular intervals, when portions of the windings are respectively connected to the pawls, the windings are serially connected while the commutator (armature) is rotated by a predetermined angle. As a result, the operation efficiency is improved. In the case where the windings are automatically connected to the pawls by a winding device, a robot or the like, the winding device, the robot or the like is easily controlled.

In the fan motor for vehicle according to the sixteenth aspect of the present invention, rotating force is generated for the armature by interaction between a magnetic field formed by the armature on which the windings get conductive via the commutator and a magnetic field formed by the field magnets fixed inside the motor yoke, and the armature is rotated by the rotating force such that the fan rotates.

In the fan motor for vehicle, among the plurality of segments of the commutator, at least one pair of segments comprise mutually different peripheral widths. Therefore, a period of switching current to the respective segments becomes irregular, and thus, magnetic exciting-force does not concentrate on a certain frequency.

Further, since at least one pair of segments comprise mutually different peripheral widths as described above, contact timing and contact-release timing of one brush deviate from those of the other brush. Accordingly, variation width of current waveform narrows at least in a value of electric current supplied to the coil (slot) connected to the pair of segments. As a result, vibration of the fan motor for vehicle, variation of rotating torque, and noise are reduced.

In the fan motor for vehicle according to the seventeenth aspect of the present invention, the plurality of segments include variable width segments, and the variable width segments each comprise a peripheral width varied within a range from 1.5% to 40% with respect to a reference width defined by a first formula of (360°/number of segments).

When each of the brushes contacts across two mutually adjacent segments of the commutator, the two segments have the same potential and current does not flow therethrough, thus resulting in a short circuit state. In this case, the coils connected to the respective two segments result in coils in the short circuit state. As the armature rotates, such coils in the short circuit state serially occur.

In the fan motor for vehicle, the plurality of segments include the above-mentioned variable width segments. Therefore, when at least one of the segments across which each of a positive brush and a negative brush contacts is the variable width segment, the contact timing and contact-release timing of one brush, i.e., timing when the coil in the above-described short circuit state occurs and timing when the coil is released from the short circuit state (timing of switching from the short circuit state to a conductive state) thereof, deviate from those of the other brush. Accordingly, variation width of current waveform narrows in a value of electric current supplied to the coil (slot) connected to the variable width segment. As a result, vibration of the fan motor for vehicle, variation of rotating torque, and noise are reduced.

In the fan motor for vehicle according to the eighteenth aspect of the present invention, the plurality of segments include some types of variable width segments whose peripheral width varies from the reference width, wherein the number of types thereof is not larger than the number defined by a second formula of (number of segments/2)+1. Further, in the fan motor for vehicle, at least one of the variable width segments comprises a peripheral width widened at a predetermined rate with respect to the reference width (hereinafter, this variable width segment is appropriately referred to as a "wide width segment"), and at least another variable width segment comprises a peripheral width narrowed at a rate substantially equal to the predetermined rate with respect to the reference width (hereinafter, this variable width segment is appropriately referred to as a "narrow width segment").

When each of the brushes contacts across two mutually adjacent segments of the commutator, the two segments have the same potential and current does not flow therethrough, thus resulting in a short circuit state. In this case, the coils connected to the respective two segments result in coils in the short circuit state. As the armature rotates, such coils in the short circuit state serially occur.

In the fan motor for vehicle, the plurality of segments include the above-described plurality of variable width segments. Therefore, when at least one of the segments across which each of the positive brush and the negative brush contacts is the variable width segment, the contact timing and contact-release timing of one brush, i.e., timing when the coil in the above-described short circuit state occurs and timing when the coil is released from the short circuit state (timing of switching from the short circuit state to a conductive state) thereof, deviate from those of the other brush. Accordingly, variation width of current waveform narrows in a value of electric current supplied to the coil (slot) connected to the variable width segment. As a result, vibration of the fan motor for vehicle, variation of rotating torque, and noise are reduced.

A peripheral width of one of the variable width segments is different from a peripheral width of another variable width segment provided opposite said one of the variable width segments with respect to a center of the commutator.

Therefore, even if the peripheral widths of the segments other than the one variable width segment and the another variable width segment (i.e., those of the variable width segments or the reference width segments which are quite different from the one variable width segment and from the another variable width segment) are made the same, timing when the positive brush contacts the respective segments and timing when the positive brush is released from the contact state certainly deviate from those for the negative brush.

For example, when the segments are formed to the commutator, slits are formed by a cutting tool to the commutator to which the segments have not been formed yet. In order to form the slits, cutting tools are connected to each other so that they are respectively oriented toward the center of the commutator in the radial direction, and a plurality of slits are then formed at a time by the cutting tools. After forming the slits, the cutting tools are separated from the commutator, and then, the plurality of cutting tools are rotated around the center of the commutator, or the commutator itself is rotated, such that another plurality of slits are formed at a time at other positions of the commutator around the center thereof.

In the fan motor for vehicle of the present invention, the peripheral widths of the segments other than the one variable width segment and the another variable width segment are respectively the same as those of the segments locating on the opposite sides thereof with respect to a center of the commutator. Therefore, when the slits are formed at other positions thereof as described above, without individually adjusting the respective rotating angles of the plurality of cutting tools, all of the cutting tools or the commutator is integrally rotated around the center of the commutator by a predetermined angle (i.e., an angle corresponding to the peripheral widths of the segments) so as to form the slits to the commutator. As a result, the operation efficiency is improved.

In the fan motor for vehicle according to the nineteenth aspect of the present invention, at least one of the variable width segments comprises a peripheral width widened at a predetermined rate with respect to the reference width (hereinafter, this variable width segment is appropriately referred to as a "wide width segment"), and at least another variable width segment comprises a peripheral width narrowed at a rate substantially equal to the predetermined rate with respect to the reference width (hereinafter, this variable width segment is appropriately referred to as a "narrow width segment"). Accordingly, the peripheral widths of the segments other than the wide width segment and the narrow width segment can be made the same. As a result, the commutator is easily designed.

In the fan motor for vehicle according to the twentieth aspect of the present invention, the plurality of segments include some types of variable width segments whose peripheral width varies from the reference width, wherein the number of types thereof is not larger than the number defined by a second formula of (number of segments/2)+1.

When each of the brushes contacts across two mutually adjacent segments of the commutator, the two segments have the same potential and current does not flow therethrough, thus resulting in a short circuit state. In this case, the coils connected to the respective two segments result in coils in the short circuit state. As the armature rotates, such coils in the short circuit state serially occur.

In the fan motor for vehicle, the plurality of segments include some types of variable width segments whose peripheral width varies from the reference width, wherein the number of types thereof is not larger than the number defined by the above second formula. Therefore, when at least one of the segments across which each of the positive brush and the negative brush contacts is the variable width segment, the contact timing and contact-release timing of one brush, i.e., timing when the coil in the above-described short circuit state occurs and timing when the coil is released from the short circuit state (timing of switching from the short circuit state to a conductive state) thereof, deviate from those of the other brush. Accordingly, variation width of current waveform narrows in a value of electric current supplied to the coil (slot) connected to the variable width segment. As a result, vibration of the fan motor for vehicle, variation of rotating torque, and noise are reduced.

MOST PREFERRED EMBODIMENTS FOR IMPLEMENTING THE INVENTION (First Embodiment)

Figure 2:
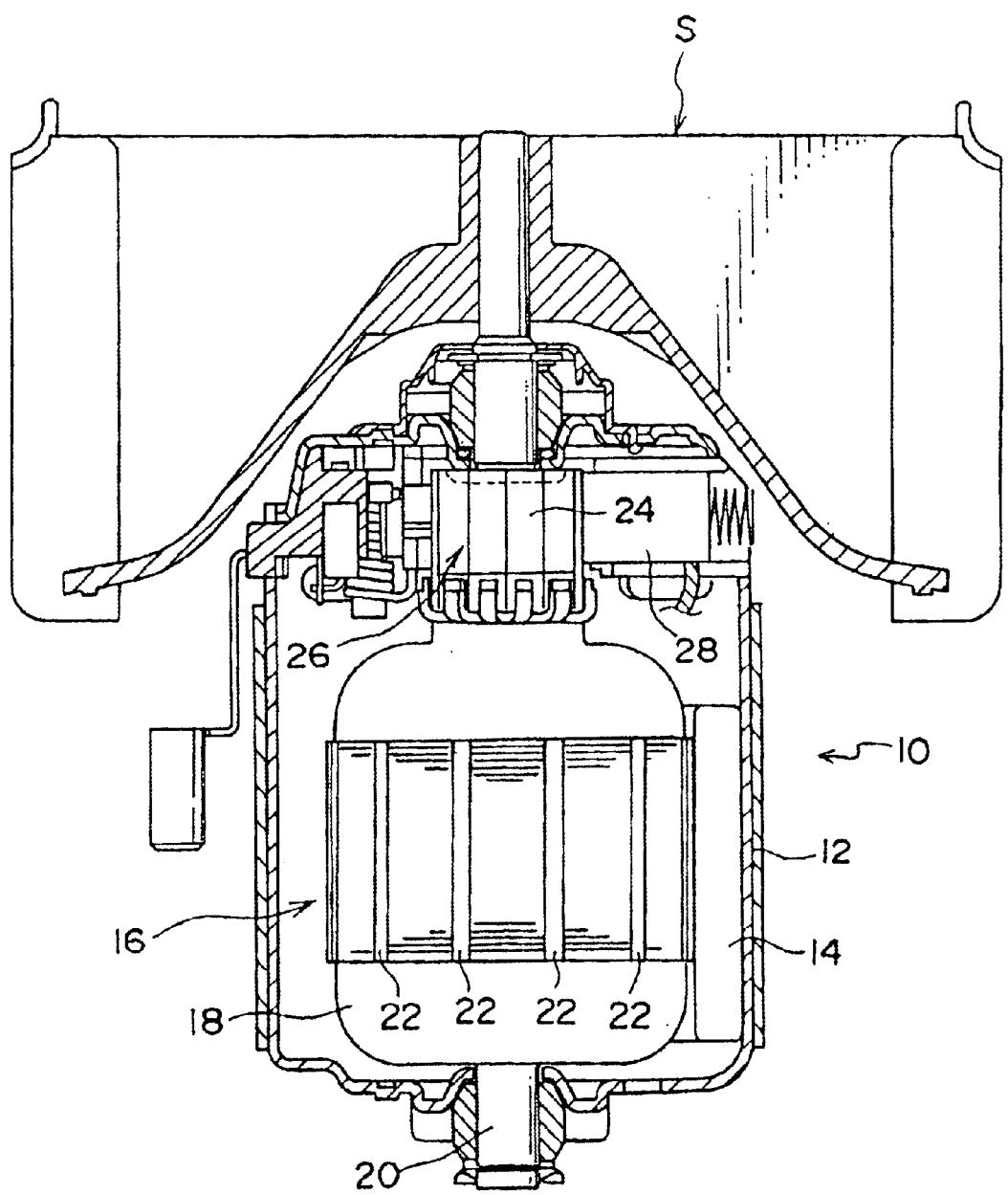
FIG. 2 is a cross-sectional view showing an overall structure of the fan motor for vehicle (electric rotating machine) according to the first embodiment of the present invention.

FIG. 2 is a cross-sectional view showing an overall structure of a fan motor for vehicle 10, which is an electric rotating machine, according to a first embodiment of the present invention.

The fan motor for vehicle 10 is applied to drive, for example, a sirocco fan S serving as a fan. A plurality of (e.g., four) field magnets 14 are fixed at predetermined intervals inside a motor yoke 12, and an armature 16 is disposed more internally than the field magnets 14.

The armature 16 has a rotating shaft 20 at a central portion of a laminated core 18. Further, windings are respectively provided between teeth of the laminated core 18 to form slots 22. In the present first embodiment, the number of slots 22 (teeth) is twelve.

Figure 3:
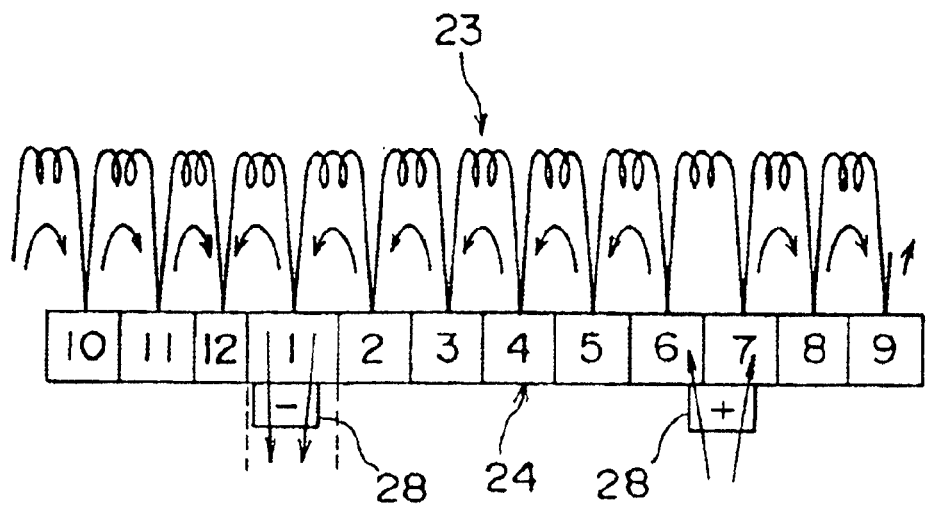
FIG. 3 is a schematic developed view showing a structure of the commutator according to the first embodiment of the present invention.
Figure 4:
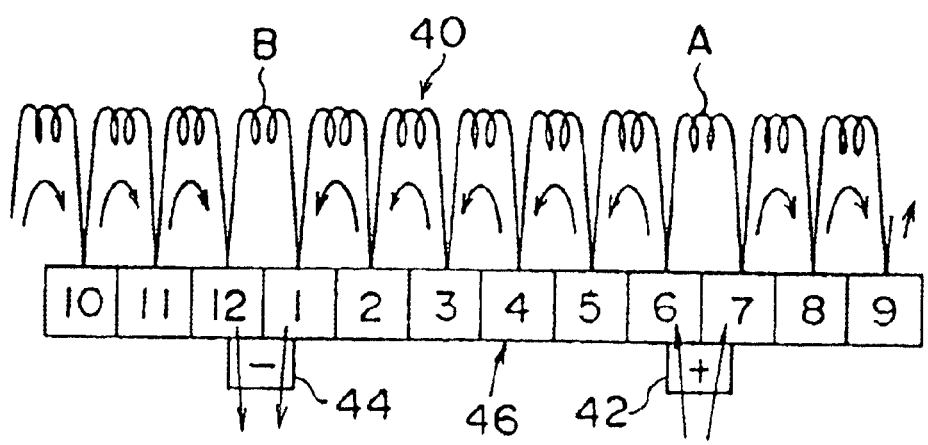
FIG. 4 is a schematic developed view showing a structure of a conventional commutator.

Coils (windings) 23 of the slots 22 are connected to a commutator 26 having twelve segments 24 so that the coils 23 respectively correspond to the segments 24. FIG. 3 is a schematic developed view showing a structure of the commutator 26.

A pair of positive/negative brushes 28 (only one brush is shown in FIG. 2) are press-contacted to the commutator 26. The width dimension of the brush 28 is made substantially the same as that of the segment 24. The brushes 28 and the commutator 26 supply electricity to the respective slots 22 (coils 23) of the armature 16 (i.e., commutate).

Figure 1:
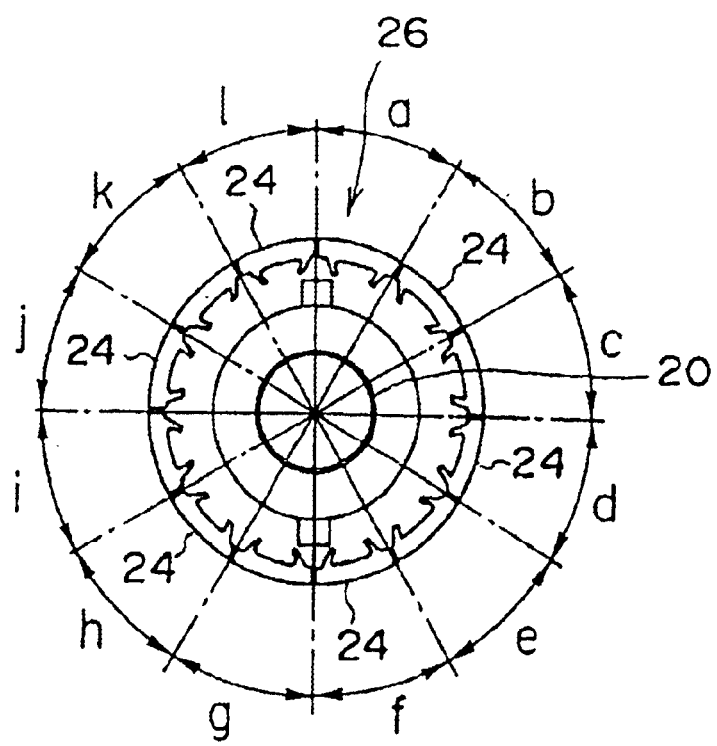
FIG. 1 is a schematic cross-sectional view showing a structure of a commutator of a fan motor for vehicle (electric rotating machine) according to a first embodiment of the present invention.

As shown in FIG. 1, among the segments 24 of the commutator 26, which segments are adjacent to each other having respective pitches "a" to "l", at least one of pairs of segments 24 that the pair of positive/negative brushes 28 simultaneously contact have mutually different pitches. For example, "a=b=c=d=e=g=h=i=j=k" and "f≠l". Namely, in FIG. 3, the pitches of the segments 24 of Nos. 12 and 1 are different from each other and from those of the other segments 24.

The operation of the present first embodiment will now be described.

In the fan motor for vehicle 10 having the above-described structure, when each of the pair of positive/negative brushes 28 contacts across two mutually adjacent segments 24 of the commutator 26, the two segments 24 have the same potential and current does not flow therethrough, thus resulting in a short circuit state. In this case, the coils 23 connected to the respective two segments 24 of the commutator result in coils in the short circuit state. As the armature rotates, such coils in the short circuit state serially occur, while the occurrence positions are primarily determined depending upon the positional relation between the segments 24 of the commutator 26 and the brushes 28.

In the fan motor for vehicle 10 according to the present first embodiment, as described above, among the segments 24 of the commutator 26, at least one of pairs of segments 24 that the pair of positive/negative brushes 28 simultaneously contact (e.g., the segments having the pitches "f" and "l" shown in FIG. 1) have mutually different pitches. Therefore, when each of the pair of positive/negative brushes 28 contacts across the pair of segments 24 having mutually different pitches (e.g., the segments 24 of Nos. 12 and 1 shown in FIG. 3), the contact timing and contact-release timing of one brush 28, i.e., timing when the coil in the above-described short circuit state occurs and timing when the coil is released from the short circuit state (timing of switching from the short circuit state to a conductive state) thereof, deviate from those of the other brush 28. (For example, as shown in FIG. 3, the short circuit state-occurrence timing and the short circuit state-release timing of the coil 23 connected to the segments 24 of Nos. 12 and 1 deviate from those of the coil 23 connected to the segments 24 of Nos. 6 and 7 in the short circuit state.) Accordingly, variation width of current waveform narrows at least in a value of electric current supplied to the coil 23 (slot 22) connected to the pair of segments 24. As a result, vibration of the fan motor for vehicle 10, variation of rotating torque, and noise are reduced.

In the above case, one of pairs of segments 24 that the pair of positive/negative brushes 28 simultaneously contact have mutually different pitches. However, an increased number of pairs thereof may have mutually different pitches, and all of the pairs thereof may have mutually different pitches. In the cases using such structures, the variation width even more narrows as a whole in a value of electric current supplied to the respective coils (slots 22). As a result, vibration of the fan motor for vehicle 10, variation of rotating torque, and noise are even more reduced.

Next, other embodiments of the present invention will be described. In the following description, components basically identical to those in the first embodiment will be referred to using the same reference numerals as in the first embodiment, and description thereof will be omitted.

(Second Embodiment)

In a second embodiment, the plurality of segments 24 of the commutator 26 comprise "reference width segments" whose peripheral width is defined by a formula of (360°/number of segments), and "variable width segments" whose peripheral width varies within a range from 1.5% to 40% with respect to that of the "reference width segments".

Figure 5:
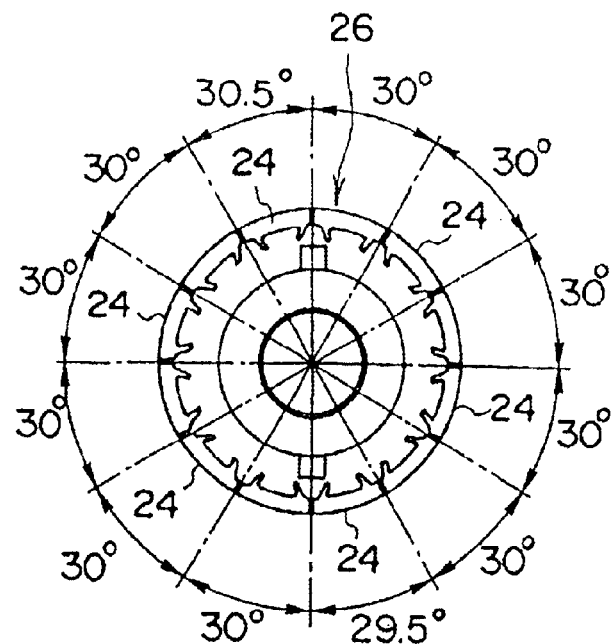
FIG. 5 is a schematic cross-sectional view showing an example of the commutator of the fan motor for vehicle (electric rotating machine) according to a second embodiment of the present invention.

For example, in the commutator 26 shown in FIG. 5, in the case where the number of segments 24 is twelve, the segments having a pitch of 30° are the "reference width segments", and the segments having pitches of 29.5° and 30.5° are the "variable width segments". As a whole, the segments 24 include three types. In this case, the variation of the peripheral width of the "variable width segments" with respect to that of the "reference width segments" is within a range of ±1.5%.

Figure 6:
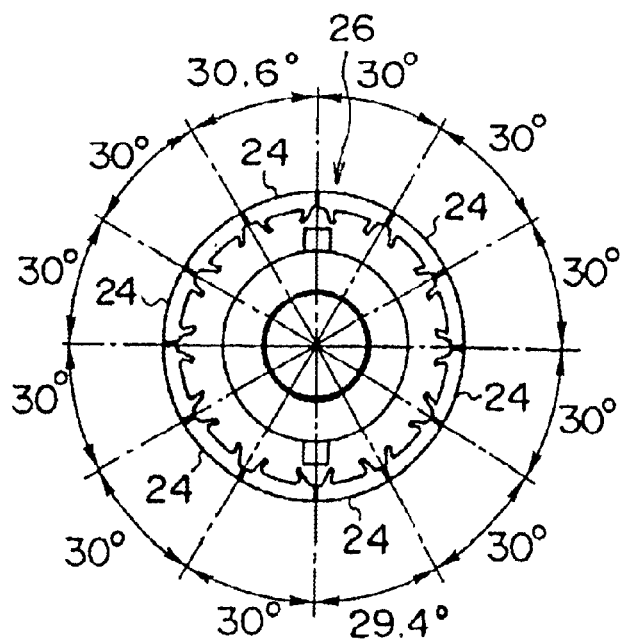
FIG. 6 is a schematic cross-sectional view showing another example of the commutator of the fan motor for vehicle (electric rotating machine) according to the second embodiment of the present invention.

For example, in the commutator 26 shown in FIG. 6, the segments having a pitch of 30° are the "reference width segments", and the segments having pitches of 29.4° and 30.6° are the "variable width segments". Also in this case, the segments 24 include three types as a whole. In this case, the variation of the peripheral width of the "variable width segments" with respect to that of the "reference width segments" is within a range of ±2%.

Figure 7:
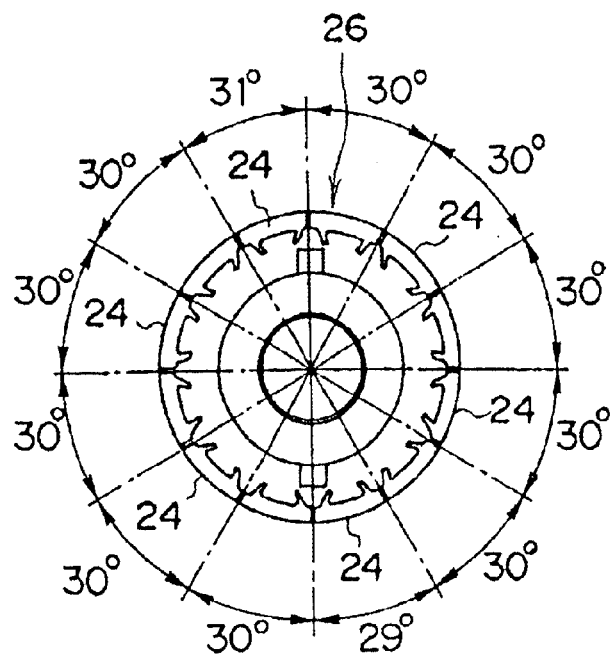
FIG. 7 is a schematic cross-sectional view showing another example of the commutator of the fan motor for vehicle (electric rotating machine) according to the second embodiment of the present invention.

For example, in the commutator 26 shown in FIG. 7, in the case where the number of segments 24 is twelve, the segments having a pitch of 30° are the "reference width segments", and the segments having pitches of 29° and 31° are the "variable width segments". As a whole, the segments 24 include three types. In this case, the variation of the peripheral width of the "variable width segments" with respect to that of the "reference width segments" is within a range of ±3.3%.

Figure 8:
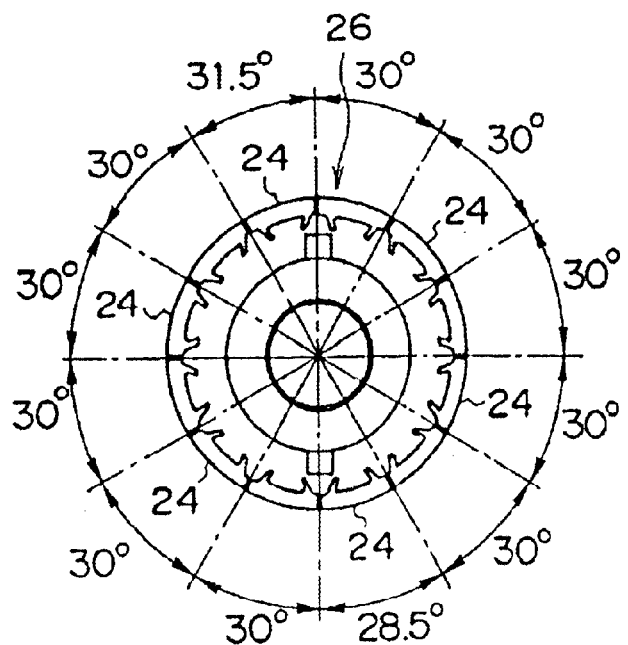
FIG. 8 is a schematic cross-sectional view showing another example of the commutator of the fan motor for vehicle (electric rotating machine) according to the second embodiment of the present invention.

For example, in the commutator 26 shown in FIG. 8, the segments having a pitch of 30° are the "reference width segments", and the segments having pitches of 28.5° and 31.5° are the "variable width segments". Also in this case, the segments 24 include three types as a whole. In this case, the variation of the peripheral width of the "variable width segments" with respect to that of the "reference width segments" is within a range of ±5%.

Figure 9:
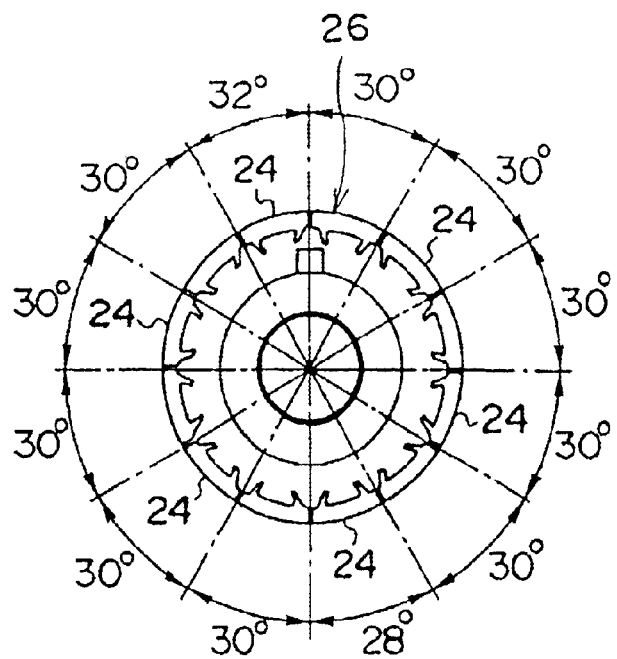
FIG. 9 is a schematic cross-sectional view showing another example of the commutator of the fan motor for vehicle (electric rotating machine) according to the second embodiment of the present invention.

For example, in the commutator 26 shown in FIG. 9, the segments having a pitch of 30° are the "reference width segments", and the segments having pitches of 28° and 32° are the "variable width segments". Also in this case, the segments 24 include three types as a whole. In this case, the variation of the peripheral width of the "variable width segments" with respect to that of the "reference width segments" is within a range of ±6.7%.

Further, as a modified example of the present second embodiment, the peripheral width of the plurality of segments 24 of the commutator 26 is varied within a range from 1.5% to 40% with respect to "reference peripheral width" defined by the formula of (360°/number of segments).

Figure 10:
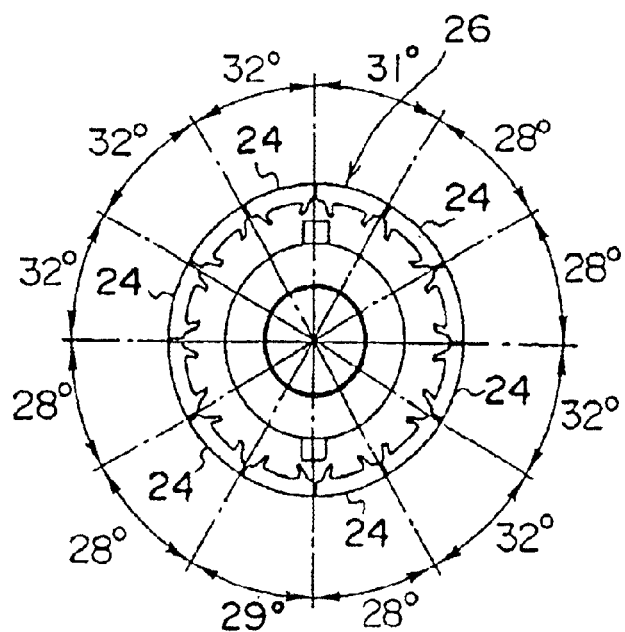
FIG. 10 is a schematic cross-sectional view showing another example of the commutator of the fan motor for vehicle (electric rotating machine) according to the second embodiment of the present invention.

For example, in the commutator 26 shown in FIG. 10, in the case where the number of segments 24 is twelve, the pitch of 30° is the "reference peripheral width", and the peripheral width of all of the segments 24 is varied from the "reference peripheral width" (so as to have pitches of 28°, 29°, 31° and 32°). In this case, the segments 24 include four types as a whole. In this case, the variation of the peripheral width of the respective segments 24 with respect to the "reference peripheral width" is within a range of ±6.7%.

The operation of the present second embodiment will now be described.

In the second embodiment, the plurality of segments 24 of the commutator 26 comprise the "reference width segments" and the "variable width segments" whose peripheral width varies within a predetermined range with respect to that of the "reference width segments", or comprise the "variable width segments" whose peripheral width varies within a predetermined range with respect to the predetermined "reference peripheral width". Therefore, a period of switching current to the respective segments 24 becomes irregular, and thus, magnetic exciting-force does not concentrate on a certain frequency. Further, when each of the pair of positive/ negative brushes 28 contacts across the "reference width segment" and the "variable width segment", or contacts across two "variable width segments" having mutually different peripheral widths, the contact timing and contact-release timing of one brush 28, i.e., timing when the coil in the above-described short circuit state occurs and timing when the coil is released from the short circuit state (timing of switching from the short circuit state to a conductive state) thereof, deviate from those of the other brush 28. Accordingly, variation width of current waveform narrows at least in a value of electric current supplied to the coil 23 (slot 22) connected to the pair of segments 24. As a result, vibration of the fan motor for vehicle 10, variation of rotating torque, and noise are reduced.

Figure 11:
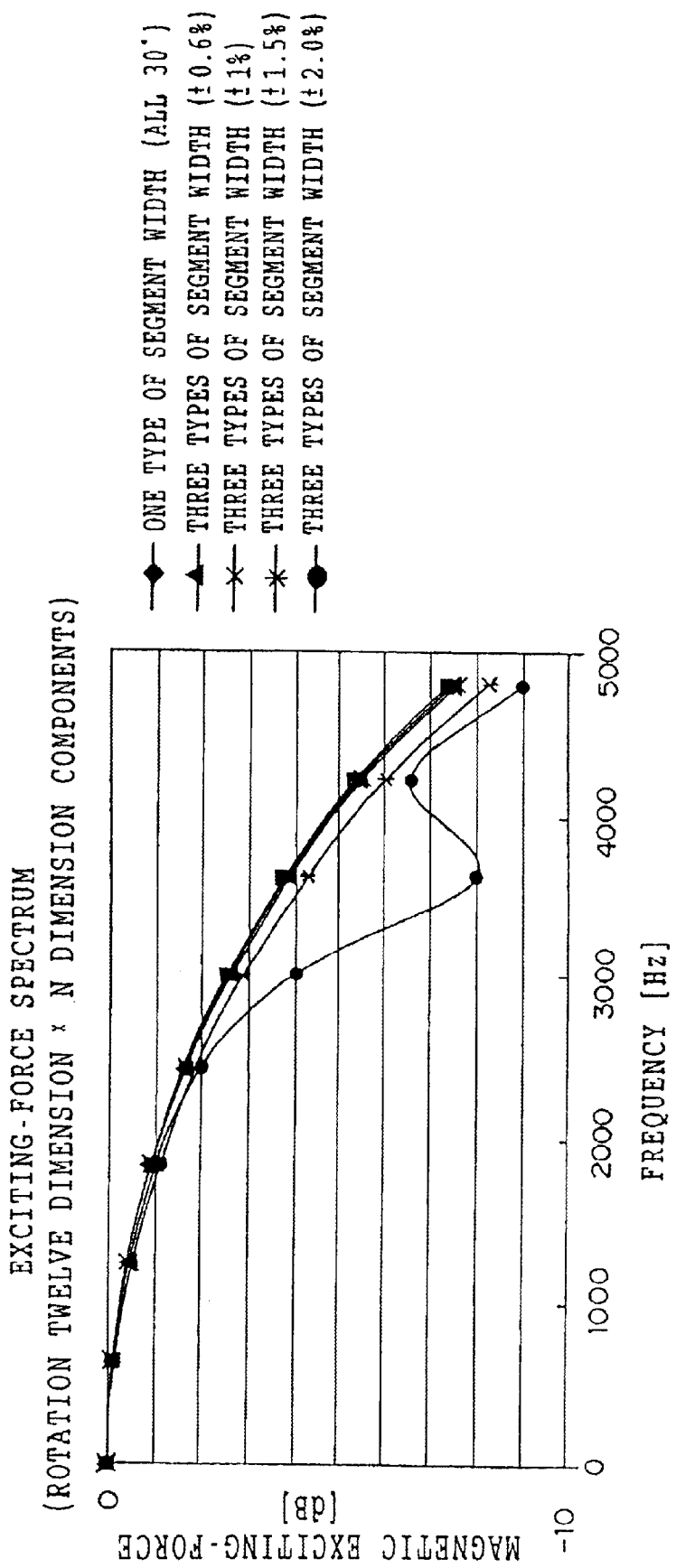
FIG. 11 is a diagram showing measurement data obtained by an experiment of characteristics of changing magnetic exciting-force of the fan motor for vehicle (electric rotating machine) according to the second embodiment of the present invention.
Figure 12:
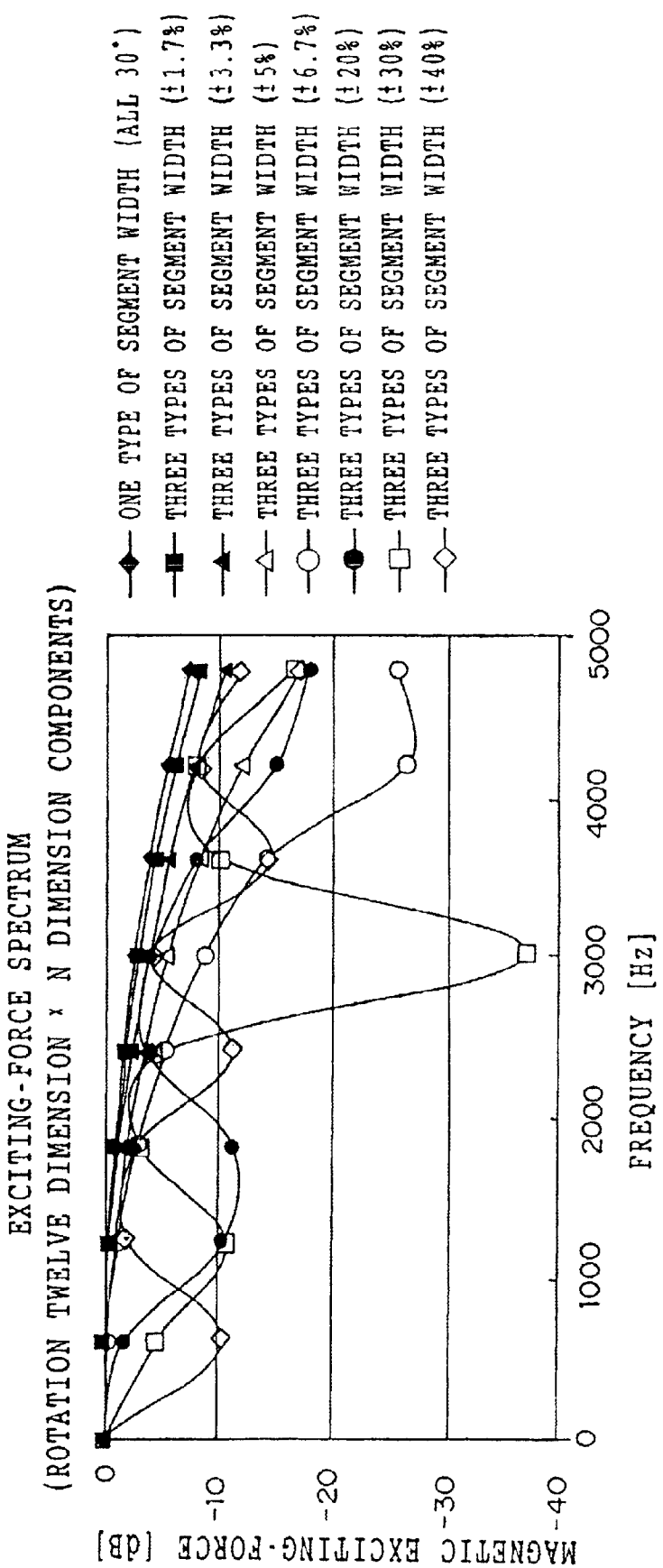
FIG. 12 is a diagram showing measurement data obtained by the experiment of the characteristics of changing magnetic exciting-force of the fan motor for vehicle (electric rotating machine) according to the second embodiment of the present invention.

FIGS. 11 and 12 show measurement data obtained by an experiment of characteristics of changing magnetic exciting-force when the peripheral width of the respective segments 24 is varied from that of the "reference width segments" or the "reference peripheral width" as described above.

In such a fan motor for vehicle 10, problematic magnetic exciting-force (magnetic noise), which results from the above-described timing when the coil in the short circuit state occurs and the timing when the coil is released from the short circuit state, is noise which is not larger than 5 KHz. It is clearly seen from FIGS. 11 and 12 that, in the case where the peripheral width of the respective segments 24 is varied from that of the "reference width segments" or the "reference peripheral width", the magnetic exciting-force is considerably reduced as compared with the case where all of the segments 24 have the same pitch.

(Third Embodiment)

In a third embodiment, the plurality of segments 24 of the commutator 26 comprise the "reference width segments" whose peripheral width is defined by the formula of (360°/number of segments 24), and some types of "variable width segments" whose peripheral width varies from that of the reference width segments, wherein the number of types thereof is not larger than the number defined by a formula of (number of segments 24/2)+1.

Figure 13:
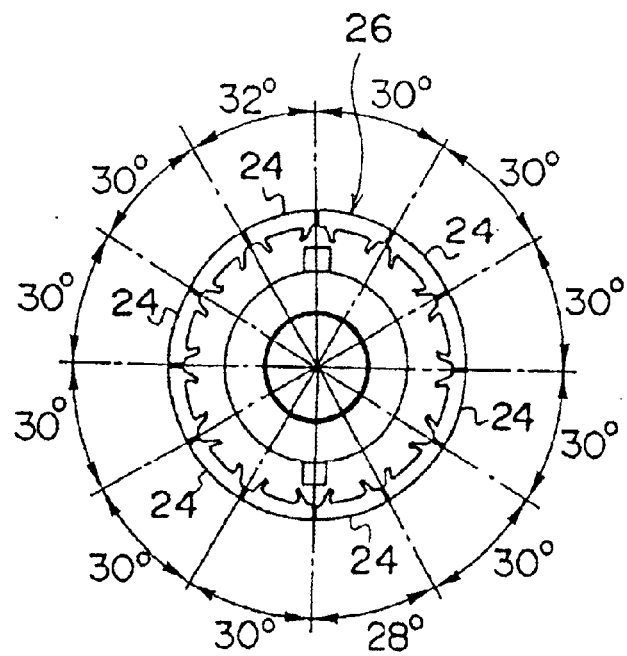
FIG. 13 is a schematic cross-sectional view showing an example of the commutator of the fan motor for vehicle (electric rotating machine) according to a third embodiment of the present invention.

For example, in the commutator 26 shown in FIG. 13, in the case where the number of segments 24 is twelve, the segments having a pitch of 30° are the "reference width segments", and the segments having pitches of 28° and 32° are the "variable width segments". As a whole, the segments 24 include three types.

Figure 14:
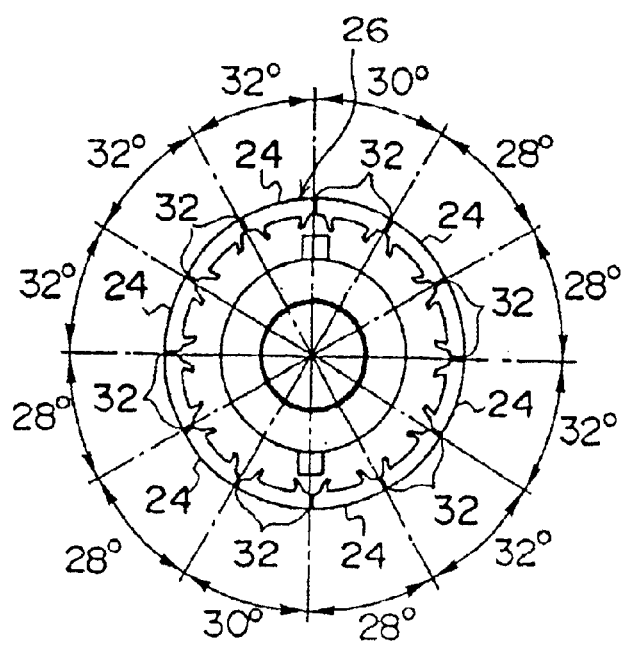
FIG. 14 is a schematic cross-sectional view showing another example of the commutator of the fan motor for vehicle (electric rotating machine) according to the third embodiment of the present invention.

For example, in the commutator 26 shown in FIG. 14, the segments having a pitch of 30° are the "reference width segments", and the segments having pitches of 28° and 32° are the "variable width segments". Also in this case, the segments 24 include three types as a whole.

Further, in the commutator 26 shown in FIG. 14, one of the plurality of variable width segments having a pitch of 32° locates opposite the variable width segment having a pitch of 28° with respect to the center of the commutator 26.

The variable width segments having a pitch of 32° other than the one locating opposite the variable width segment having a pitch of 28° with respect to the center of the commutator 26 locate respectively opposite the variable width segments having the same pitch of 32° with respect to the center of the commutator 26.

Furthermore, the variable width segments having a pitch of 28° other than the one locating opposite the variable width segment having a pitch of 32° with respect to the center of the commutator 26 locate respectively opposite the variable width segments having the same pitch of 28° with respect to the center of the commutator 26.

One of the above-mentioned reference width segments having a pitch of 30° locates opposite the other one with respect to the center of the commutator 26.

Figure 15:
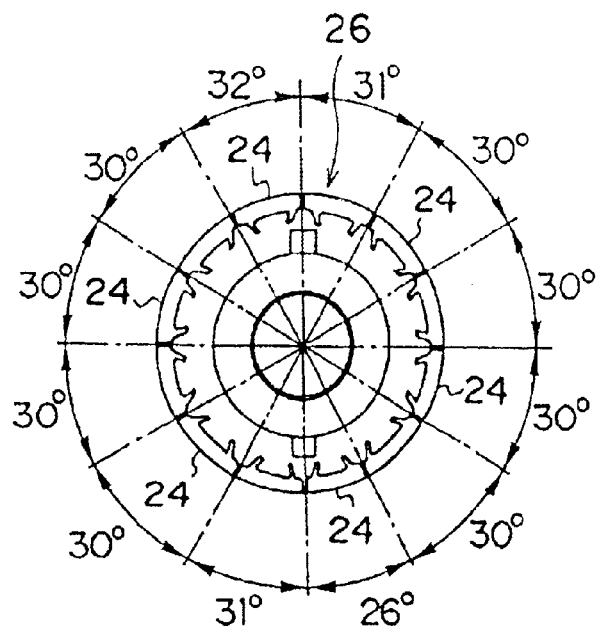
FIG. 15 is a schematic cross-sectional view showing another example of the commutator of the fan motor for vehicle (electric rotating machine) according to the third embodiment of the present invention.

For example, in the commutator 26 shown in FIG. 15, the segments having a pitch of 30° are the "reference width segments", and the segments having pitches of 26°, 31° and 32° are the "variable width segments". In this case, the segments 24 include four types as a whole.

Figure 16:
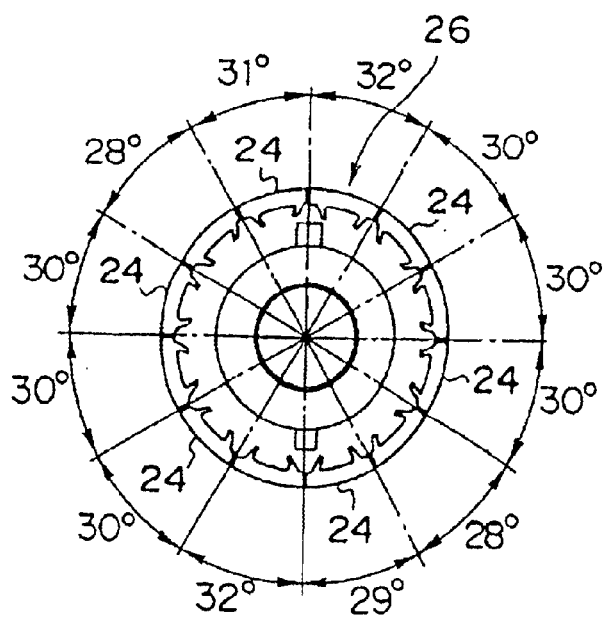
FIG. 16 is a schematic cross-sectional view showing another example of the commutator of the fan motor for vehicle (electric rotating machine) according to the third embodiment of the present invention.

For example, in the commutator 26 shown in FIG. 16, the segments having a pitch of 30° are the "reference width segments", and the segments having pitches of 28°, 29°, 31° and 32° are the "variable width segments". In this case, the segments 24 include five types as a whole.

Figure 17:
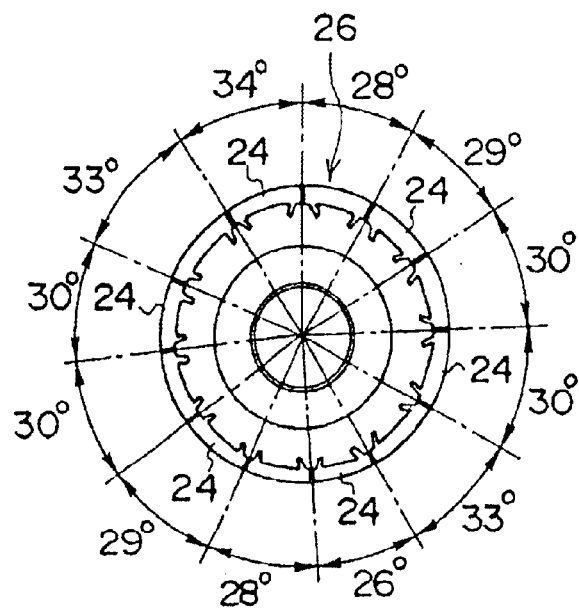
FIG. 17 is a schematic cross-sectional view showing another example of the commutator of the fan motor for vehicle (electric rotating machine) according to the third embodiment of the present invention.

For example, in the commutator 26 shown in FIG. 17, the segments having a pitch of 30° are the "reference width segments", and the segments having pitches of 26°, 28°, 29°, 33° and 34° are the "variable width segments". In this case, the segments 24 include six types as a whole.

Figure 18:
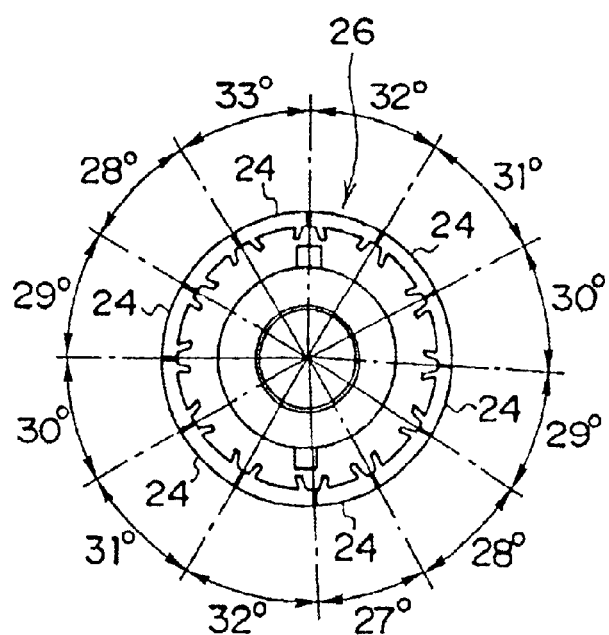
FIG. 18 is a schematic cross-sectional view showing another example of the commutator of the fan motor for vehicle (electric rotating machine) according to the third embodiment of the present invention.

For example, in the commutator 26 shown in FIG. 18, the segments having a pitch of 30° are the "reference width segments", and the segments having pitches of 27°, 28°, 29°, 31°, 32° and 33° are the "variable width segments". In this case, the segments 24 include seven types as a whole.

The operation of the present third embodiment will now be described.

In the third embodiment, the plurality of segments 24 of the commutator 26 comprise the "reference width segments" and a predetermined number of types of "variable width segments" whose peripheral width varies from that of the "reference width segments". Therefore, a period of switching current to the respective segments 24 becomes irregular, and thus, magnetic exciting-force does not concentrate on a certain frequency. Further, when each of the pair of positive/negative brushes 28 contacts across the "reference width segment" and the "variable width segment", or contacts across two "variable width segments" having mutually different peripheral widths, the contact timing and contact-release timing of one brush 28, i.e., timing when the coil in the above-described short circuit state occurs and timing when the coil is released from the short circuit state (timing of switching from the short circuit state to a conductive state) thereof, deviate from those of the other brush 28. Accordingly, variation width of current waveform narrows at least in a value of electric current supplied to the coil 23 (slot 22) connected to the pair of segments 24. As a result, vibration of the fan motor for vehicle 10, variation of rotating torque, and noise are reduced.

Figure 19:
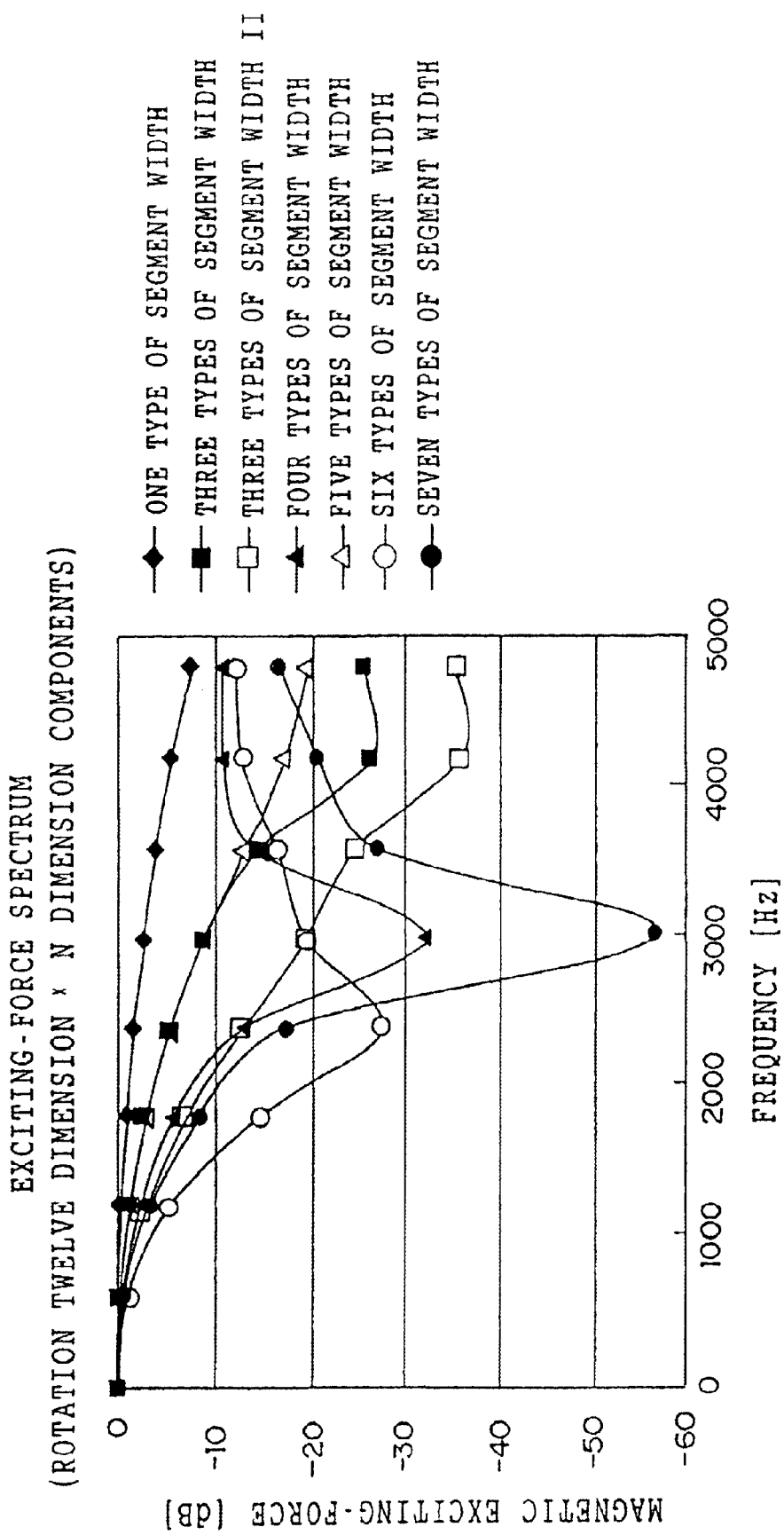
FIG. 19 is a diagram showing measurement data obtained by an experiment of the characteristics of changing magnetic exciting-force of the fan motor for vehicle (electric rotating machine) according to the third embodiment of the present invention.

FIG. 19 shows measurement data obtained by an experiment of characteristics of changing magnetic exciting-force when the segments 24 comprise the "reference width segments" and a predetermined number of types of "variable width segments" whose peripheral width varies from that of the "reference width segments" as described above.

In such a fan motor for vehicle 10, problematic magnetic exciting-force (magnetic noise), which results from the above-described timing when the coil in the short circuit state occurs and the timing when the coil is released from the short circuit state, is noise which is not larger than 5 KHz. It is clearly seen from FIG. 19 that, in the case where the segments 24 comprise the "reference width segments" and a predetermined number of types of "variable width segments" whose peripheral width varies from that of the "reference width segments", the magnetic exciting-force is considerably reduced as compared with the case where all of the segments 24 have the same pitch.

When, for example, in the commutator 26 shown in FIG. 14, the pitches of the segments 24 other than the pair of variable width segments, which are opposed to each other with respect to the center of the commutator 26 and which have mutually different pitches (of 32° and 28°), are respectively made the same as those of the segments 24 locating on the opposite sides thereof with respect to the center of the commutator 26, the segments 24 get to be easily formed.

Specifically, when the segments 24 are formed to the commutator 26, slits 32 (see FIG. 14) are formed by a cutting tool to the commutator 26 to which the segments 24 have not been formed yet. In order to form the slits 32, cutting tools are connected to each other so that they are respectively oriented toward the center of the commutator 26 in the radial direction, and a plurality of slits 32 are then formed at a time by the cutting tools. After forming the slits 32, the cutting tools are separated from the commutator 26, and then, the cutting tools are rotated around the center of the commutator 26, or the commutator 26 itself is rotated, such that another plurality of slits 32 are formed at a time at other positions of the commutator 26 around the center thereof.

As described above, the pitches of the segments 24 other than the pair of variable width segments, which are opposed to each other with respect to the center of the commutator 26 and which have mutually different pitches (of 32° and 28°), are respectively the same as those of the segments 24 locating on the opposite sides thereof with respect to the center of the commutator 26. Therefore, when the slits 32 are formed at other positions thereof as described above, without individually adjusting the respective rotating angles of the plurality of cutting tools, all of the cutting tools or the commutator 26 is integrally rotated around the center of the commutator 26 by an angle corresponding to the pitches of the other segments 24 so as to form the slits 32 to the commutator 26. As a result, the operation efficiency is improved.

(Fourth Embodiment)

Figure 21:
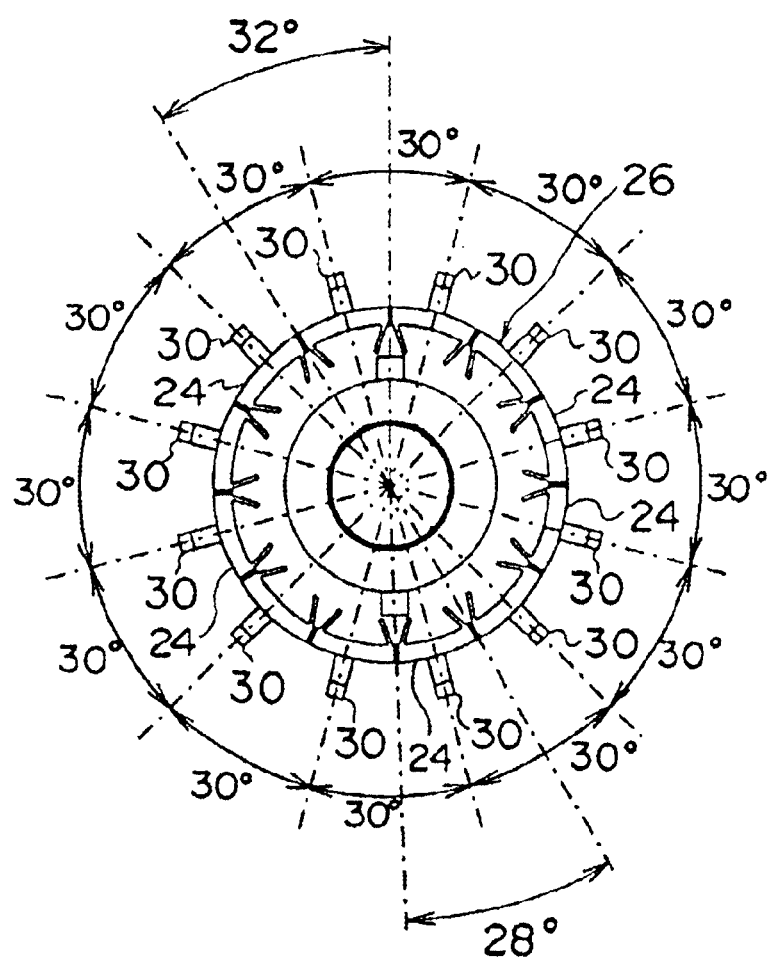
FIG. 21 is a cross-sectional view showing an overall structure of the fan motor for vehicle (electric rotating machine) according to the fourth embodiment of the present invention.

In the same manner as the commutator 26 shown in FIG. 13 in the above-described second embodiment, in the commutator 26 shown in FIG. 21 in the present embodiment, the number of segments 24 is twelve, the segments having a pitch of 30° are the "reference width segments", and the segments having pitches of 28° and 32° are the "variable width segments". As a whole, the segments 24 include three types.

Figure 20:
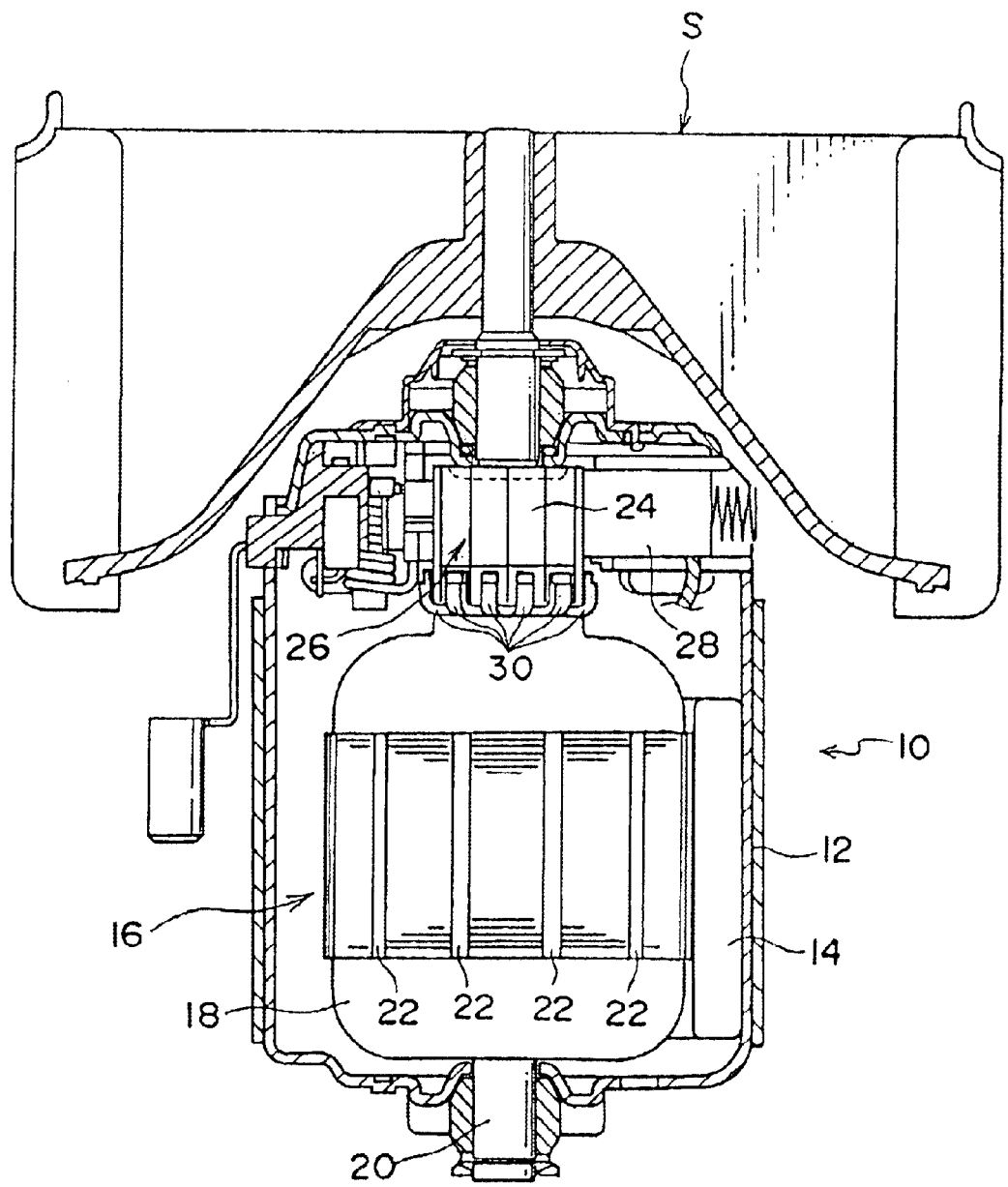
FIG. 20 is a schematic cross-sectional view showing an example of the commutator of the fan motor for vehicle (electric rotating machine) according to a fourth embodiment of the present invention.

As shown in FIGS. 20 and 21, in the present embodiment, a plurality of pawls 30 are formed to the commutator 26 so that they respectively correspond to the segments 24. (Although the pawls 30 are respectively formed to the segments 24 of the commutator 26 also in each of the above-described embodiments, the pawls 30 have not especially been described so far.)

The pawls 30 respectively extend from the segments 24 of the commutator 26, and portions of the windings forming the coils 23 are respectively engaged with the pawls 30 in the conductive state. Accordingly, the coils 23 are respectively conductive to the segments 24 of the commutator 26.

The pawls for a conventional commutator have been respectively formed basically at the peripheral centers of the segments. In the present embodiment, although the pawls 30 respectively extend from the vicinities of the peripheral centers of the segments 24, the pawls 30 respectively extend from the segments 24 at predetermined angular intervals around the center of the commutator 26 (the interval is 30° when there are twelve segments 24 as in the present embodiment).

As described above, in the commutator 26 shown in FIG. 20 (FIG. 13), the pitches of the variable width segments 24 are 32° and 28°. In the present embodiment, however, the pawls 30 are formed at intervals of 30°. Thus, in the variable width segment 24 having a pitch of 32°, the pawl 30 is formed at a position clockwise shifted by 1° from the peripheral center thereof. Therefore, although the segment 24, which is counterclockwise adjacent to the variable width segment 24 having a pitch of 32°, has a pitch of 30°, the pawl 30 is formed at a position clockwise shifted by 1° from the peripheral center thereof. Further, in the variable width segment 24 having a pitch of 28°, the pawl 30 is formed at a position clockwise shifted by 1° from the peripheral center thereof.

However, in the segment 24 having a pitch of 30°, which is counterclockwise adjacent to the variable width segment 24 having a pitch of 28°, the pawl 30 is formed at the peripheral center thereof due to the pitch between the pawls 30.

As described above, since the structure of the commutator 26 in the present embodiment is the same as that shown in FIG. 13 in the second embodiment, basically the same operation is achieved and the same effects are obtained as in the second embodiment.

Further, in the present embodiment, the pawls 30, with which portions of the windings forming the coils 23 are respectively engaged, are formed at regular intervals basically regardless of the pitches of the respective segments 24 of the commutator 26. Accordingly, when the windings are serially engaged with the respective pawls 30, if the commutator 26 is rotated by a predetermined angle around the axis thereof, the winding engages with the next pawl 30. As a result, the winding device such as a robot is easily controlled.

INDUSTRIAL APPLICABILITY

As described above, the electric rotating machine and the fan motor for vehicle according to the present invention are utilized for any types of electric rotating machines and fan motors for vehicle in which basically brushes slide on a commutator, such as a motor for ventilating of an air-conditioner to be provided in a vehicle.

What is claimed is:

1. An electric rotating machine comprising:
a motor yoke;
a field magnet fixed inside the motor yoke;
an armature comprising a rotating shaft at a central portion of a laminated core on which windings are wound, wherein a commutator comprising a plurality of segments, in which at least one pair of segments comprise mutually different peripheral widths, is attached to an end portion of the rotating shaft; and
a plurality of brushes disposed opposite each other with the commutator therebetween, so as to slide on the commutator of the armature.

2. The electric rotating machine of claim 1, wherein the plurality of segments include variable width segments, and the variable width segments each comprise a peripheral width varied within a range from 1.5% to 40% with respect to a reference width defined by a first formula of (360°/number of segments).

3. The electric rotating machine of claim 2, wherein the plurality of segments include some types of variable width segments whose peripheral width varies from the reference width, wherein the number of types thereof is not larger than the number defined by a second formula of (number of segments/2)+1.

4. The electric rotating machine of claim 3, wherein the plurality of segments include reference width segments, and the reference width segments each comprise a peripheral width substantially equal to the reference width.

5. The electric rotating machine of claim 4, wherein at least one of the variable width segments comprises a peripheral width widened at a predetermined rate with respect to the reference width, and at least another variable width segment comprises a peripheral width narrowed at a rate substantially equal to the predetermined rate with respect to the reference width.

6. The electric rotating machine of claim 5, wherein a peripheral width of one of the variable width segments is different from a peripheral width of another variable width segment provided opposite said one of the variable width segments with respect to a center of the commutator, and peripheral widths of segments other than said one and said another variable width segments are respectively substantially equal to peripheral widths of the segments respectively provided opposite said segments other than said one and said another variable width segments with respect to the center of the commutator.

7. The electric rotating machine of claim 6, further comprising a plurality of pawls, which are respectively formed to the plurality of segments and with which portions of the windings are respectively engaged in a conductive state, wherein at least one of the plurality of pawls is provided at a position displaced from the peripheral center of the respective segment.

8. The electric rotating machine of claim 2, wherein the plurality of segments include reference width segments, and the reference width segments each comprise a peripheral width substantially equal to the reference width.

9. The electric rotating machine of claim 8, wherein at least one of the variable width segments comprises a peripheral width widened at a predetermined rate with respect to the reference width, and at least another variable width segment comprises a peripheral width narrowed at a rate substantially equal to the predetermined rate with respect to the reference width.

10. The electric rotating machine of claim 2, wherein at least one of the variable width segments comprises a peripheral width widened at a predetermined rate with respect to the reference width, and at least another variable width segment comprises a peripheral width narrowed at a rate substantially equal to the predetermined rate with respect to the reference width.

11. The electric rotating machine of claim 2, further comprising a plurality of pawls, which are respectively formed to the plurality of segments and with which portions of the windings are respectively engaged in a conductive state, wherein at least one of the plurality of pawls is provided at a position displaced from the peripheral center of the respective segment.

12. The electric rotating machine of claim 1, wherein the plurality of segments include some types of variable width segments whose peripheral width varies from a reference width, wherein the number of types thereof is not larger than the number defined by a second formula of (number of segments/2)+1.

13. The electric rotating machine of claim 12, wherein the plurality of segments include reference width segments, and the reference width segments each comprise a peripheral width substantially equal to the reference width.

14. The electric rotating machine of claim 12, further comprising a plurality of pawls, which are respectively formed to the plurality of segments and with which portions of the windings are respectively engaged in a conductive state, wherein at least one of the plurality of pawls is provided at a position displaced from the peripheral center of the respective segment.

15. The electric rotating machine of claim 1, further comprising a plurality of pawls, which are respectively formed to the plurality of segments and with which portions of the windings are respectively engaged in a conductive state, wherein at least one of the plurality of pawls is provided at a position displaced from the peripheral center of the respective segment.

16. A fan motor for vehicle comprising:

a motor yoke;

a field magnet fixed inside the motor yoke;

an armature comprising a rotating shaft at a central portion of a laminated core on which windings are wound, wherein a commutator comprising a plurality of segments, in which at least one pair of segments comprise mutually different peripheral widths, is attached to an end portion of the rotating shaft;

a plurality of brushes disposed opposite each other with the commutator therebetween, so as to slide on the commutator of the armature; and a fan attached to the rotating shaft so as to rotate as the armature rotates.

17. The fan motor for vehicle of claim 16, wherein the plurality of segments include variable width segments, and the variable width segments each comprise a peripheral width varied within a range from 1.5% to 40% with respect to a reference width defined by a first formula of (360°/ number of segments).

18. The fan motor for vehicle of claim 17, wherein the plurality of segments include some types of variable width segments whose peripheral width varies from the reference width, wherein the number of types thereof is not larger than the number defined by a second formula of (number of segments/2)+1; wherein at least one of the variable width segments comprises a peripheral width widened at a predetermined rate with respect to the reference width, and at least another variable width segment comprises a peripheral width narrowed at a rate substantially equal to the predetermined rate with respect to the reference width; and wherein a peripheral width of one of the variable width segments is different from a peripheral width of another variable width segment provided opposite said one of the variable width segments with respect to a center of the commutator, and peripheral widths of segments other than said one and said another variable width segments are respectively substantially equal to peripheral widths of the segments respectively provided opposite said segments other than said one and said another variable width segments with respect to the center of the commutator.

19. The fan motor for vehicle of claim 17, wherein at least one of the variable width segments comprises a peripheral width widened at a predetermined rate with respect to the reference width, and at least another variable width segment comprises a peripheral width narrowed at a rate substantially equal to the predetermined rate with respect to the reference width.

20. The fan motor for vehicle of claim 16, wherein the plurality of segments include some types of variable width segments whose peripheral width varies from a reference width, wherein the number of types thereof is not larger than the number defined by a second formula of (number of segments/2)+1.

* * * * *